US010152590B2

(12) United States Patent
Liu et al.

(10) Patent No.: US 10,152,590 B2
(45) Date of Patent: Dec. 11, 2018

(54) IMPLEMENTING A WEBSOCKET SERVER TO CIRCUMVENT ACCESS CONTROLS, BY A WEB BROWSER, ON A WEB APPLICATION

(71) Applicant: Oracle International Corporation, Redwood Shores, CA (US)

(72) Inventors: Yuting Liu, Beijing (CN); Mingjie Li, Beijing (CN); Darshan Kumar, San Ramon, CA (US); Kuangyang Huang, Fremont, CA (US); Tsunghsi Yu, San Jose, CA (US); Kunal Kumar, Bihar (IN); Qiang Dong, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 226 days.

(21) Appl. No.: 15/159,572

(22) Filed: May 19, 2016

(65) Prior Publication Data
US 2017/0193221 A1  Jul. 6, 2017

Related U.S. Application Data

(60) Provisional application No. 62/274,752, filed on Jan. 4, 2016.

(51) Int. Cl.
| | |
|---|---|
| G06F 21/00 | (2013.01) |
| G06F 21/53 | (2013.01) |
| H04L 29/08 | (2006.01) |
| G06F 17/30 | (2006.01) |
| H04L 29/06 | (2006.01) |

(52) U.S. Cl.
CPC .............. *G06F 21/53* (2013.01); *G06F 17/30* (2013.01); *H04L 63/00* (2013.01); *H04L 67/02* (2013.01); *G06F 2221/2149* (2013.01)

(58) Field of Classification Search
None
See application file for complete search history.

(56) References Cited

U.S. PATENT DOCUMENTS

| | | | | |
|---|---|---|---|---|
| 2009/0077471 A1* | 3/2009 | Lahr | ................. | G06F 17/30799 715/748 |
| 2010/0146523 A1* | 6/2010 | Brigaut | ............. | G06F 17/30203 719/330 |
| 2010/0306547 A1* | 12/2010 | Fallows | ................ | G06F 21/305 713/178 |
| 2013/0018945 A1* | 1/2013 | Vendrow | ............. | H04L 65/1006 709/203 |
| 2014/0059217 A1* | 2/2014 | Pizurica | .................. | H04L 43/08 709/224 |
| 2014/0222963 A1* | 8/2014 | Gangadharan | ...... | H04L 65/1016 709/219 |
| 2014/0237120 A1* | 8/2014 | Hwang | ................. | G06F 9/5044 709/226 |
| 2015/0161384 A1* | 6/2015 | Gu | ......................... | G06F 21/54 726/22 |

(Continued)

*Primary Examiner* — Maung T Lwin
(74) *Attorney, Agent, or Firm* — Invoke

(57) ABSTRACT

Operations include executing a WebSocket server on a machine executing a web browser; establishing a connection between the WebSocket server and the web browser; receiving, by the WebSocket server from the web browser, a request requiring execution of a local application on the machine; and executing, by the WebSocket server, the local application to serve the request.

17 Claims, 2 Drawing Sheets

(56) References Cited

U.S. PATENT DOCUMENTS

| | | | |
|---|---|---|---|
| 2015/0358328 A1* | 12/2015 | Kaplan | H04L 67/1095 726/6 |
| 2016/0127452 A1* | 5/2016 | Newman | H04L 67/10 709/203 |
| 2016/0255088 A1* | 9/2016 | Kaplan | H04L 63/102 726/7 |

* cited by examiner

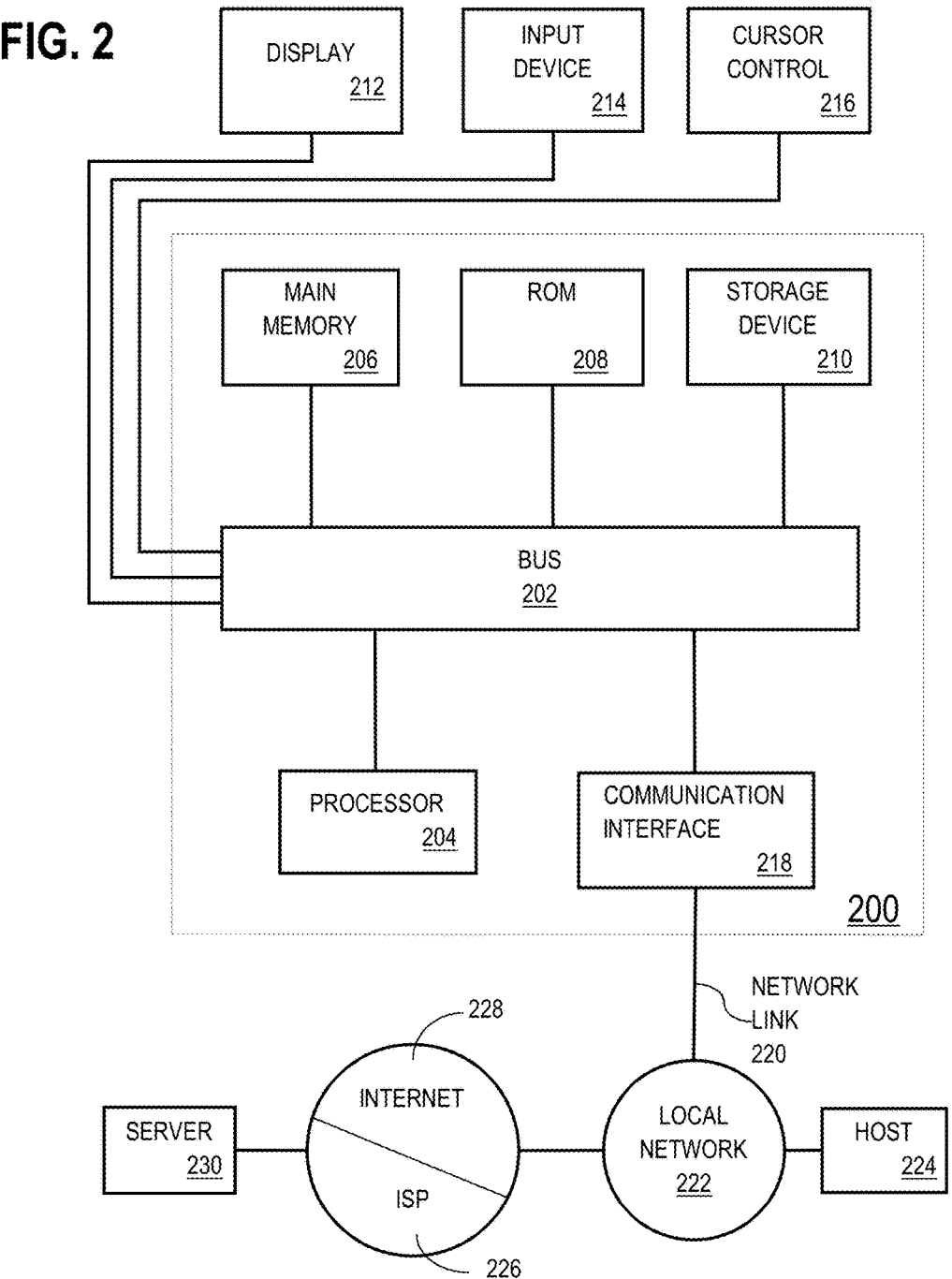

IMPLEMENTING A WEBSOCKET SERVER TO CIRCUMVENT ACCESS CONTROLS, BY A WEB BROWSER, ON A WEB APPLICATION

BENEFIT CLAIM, INCORPORATION BY REFERENCE

This application claims benefit to provisional application No. 62/274,752 filed on Jan. 4, 2016, which is hereby incorporated by reference.

TECHNICAL FIELD

The present disclosure relates to providing access to a web application sandboxed by a web browser. In particular, the present disclosure relates to implementing a WebSocket server to circumvent access controls, by a web browser, on a web application.

BACKGROUND

In computer security, a sandbox is a security mechanism for separating running programs. It is often used to execute untested code, or untrusted programs from unverified third parties, suppliers, untrusted users and untrusted websites. A sandbox typically provides a tightly controlled set of resources for guest programs to run in, such as scratch space on disk and memory. Network access, the ability to inspect the host system or read from input devices are usually disallowed or heavily restricted. Sandboxing is frequently used to test unverified programs that may contain a virus or other malicious code, without allowing the software to harm the host device.

As an example, a web browser implements a sandbox to restrict a web application executed by the web browser. Specifically, the web browser restricts the web application from accessing other applications executing on the same machine as the web browser. The web browser may also restrict the web application from accessing certain data sets stored on the machine executing the web browser. Furthermore, the web browser may also restrict the web application from accessing applications executing or data stored on machines within a same Local Area Network (LAN) as the machine executing the web browser. In order to access the restricted applications and/or the data, the web application may rely upon a web browser plug-in which has access permissions necessary to access the restricted applications and/or data.

Netscape Plugin Application Programming Interface (NPAPI) is a cross-platform plugin architecture supported by many web browsers. NPAPI plug-ins are generally not as restricted as the web applications themselves. As a result, NPAPI plug-ins may be used by web applications to access (a) applications executing on the same machine as the web browser or (b) data stored on the same machine as the web browser. Some web browsers today are being updated to remove support for NPAPI plug-ins due to security risks associated with NPAPI plug-ins.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates a system in accordance with one or more embodiments.

DETAILED DESCRIPTION

Figure 1:
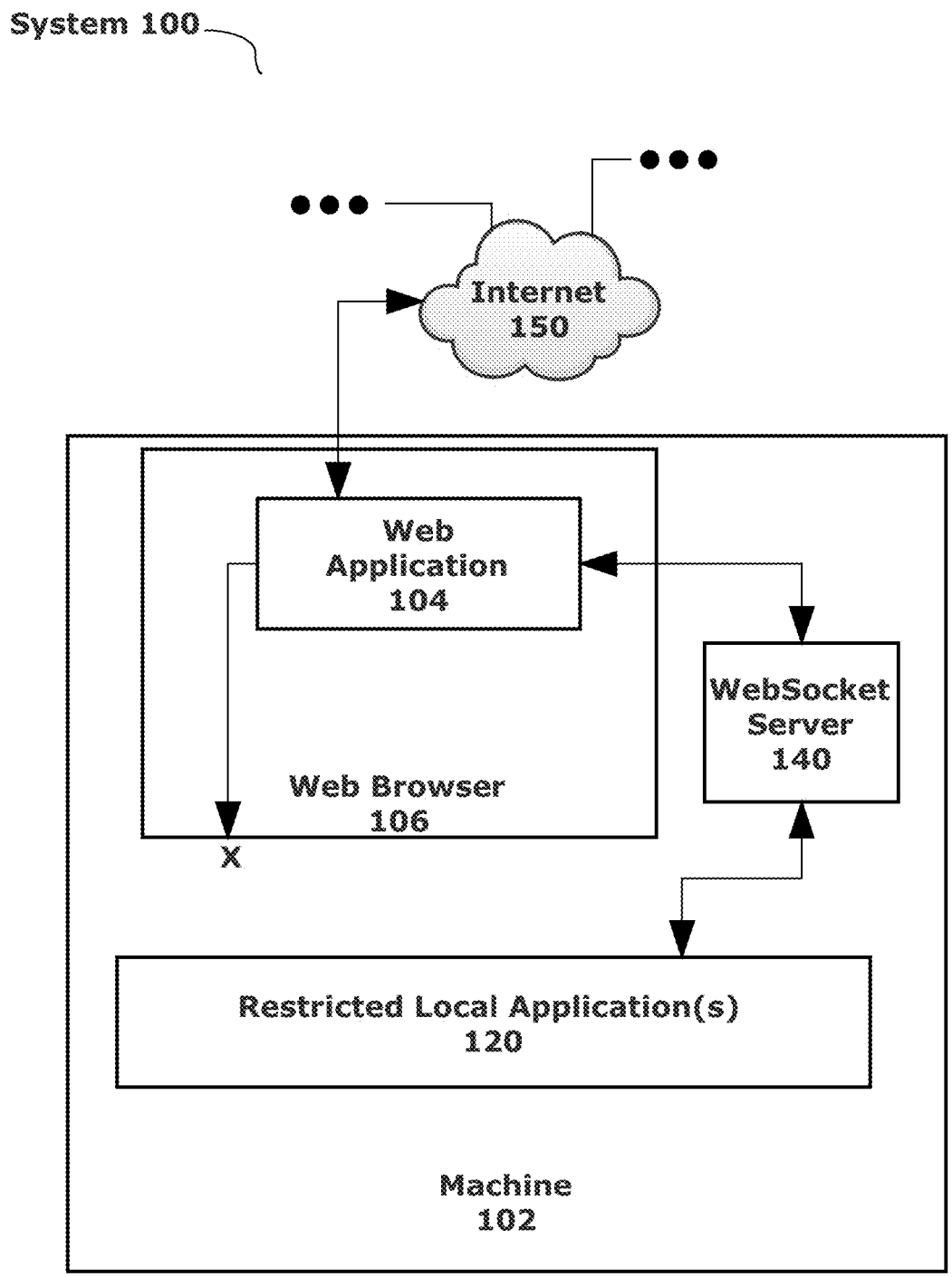
FIG. 1 illustrates a system design for circumventing access controls, implemented by web browsers, on web applications in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM DESIGN FOR CIRCUMVENTING ACCESS CONTROLS, IMPLEMENTED BY WEB BROWSERS, ON WEB APPLICATIONS
3. USING A WEBSOCKET SERVER TO SERVE REQUESTS, FROM A WEB APPLICATION, RECEIVED THROUGH A WEB BROWSER EXECUTING ON A SAME MACHINE AS THE WEBSOCKET SERVER
4. MISCELLANEOUS, EXTENSIONS
5. HARDWARE OVERVIEW

1. General Overview

One or more embodiments include implementing a WebSocket server. The WebSocket server executes on a same machine as a web browser. The WebSocket server serves one or more requests from a web application executed by the web browser. The web application initiates a connection between the web application and the WebSocket server via the web browser. Specifically, the web application causes the web browser to transmit a connection request to a particular port, of the WebSocket server, that follows a WebSocket protocol. The WebSocket server, listening for connection requests on the particular port, detects the connection request from the web browser. The web application and WebSocket server complete an authentication process and establish a connection. The web application transmits one or more requests to the WebSocket server via the web browser. The WebSocket server serves the requests by executing local applications and/or accessing data that the web application cannot directly access.

2. System Design for Circumventing Access Controls, Implemented by Web Browsers, on Web Applications FIG. 1 illustrates an example of a system 100 in accordance with one or more embodiments. The system 100 may include additional machines and components than illustrated or described below. As illustrated in FIG. 1, system 100 includes a machine 102 which executes applications. The applications include a web browser 106 and a WebSocket server 140. While illustrated on the same machine 102 for purposes of clarity, web browser 106 and WebSocket server 140 may be implemented on different machines within the same Local Area Network (LAN). The web browser 106 restricts web application 104, executed by web browser 106, from directly accessing other applications (referred to as "restricted local applications 120") executed by machine 102.

Machine 102 may refer to any device that includes a hardware processor. Machine 102 manages applications (e.g., web browser 106, WebSocket server 140, and restricted local applications 120) and a respective data set (not illustrated). Examples of machine 102 include, but are not limited to, a computer, a tablet, a laptop, a desktop, a netbook, a mobile handset, a smartphone, a personal digital assistant ("PDA"), and a device configured for use in an Internet of Things environment ("IoT device"). Machine 102 may also refer to a Virtual Machine (VM).

In an embodiment, restricted local applications 120 refer to applications that are (a) local to the web browser 106 and (b) restricted for access by web application 104. Applications that are local to the web browser 106 include applications executing on a same machine as web browser 106 (e.g., machine 102) or executing on another machine within a same Local Area Network (LAN) as a machine which executes web browser 106. Examples of restricted local applications 120 include, but are not limited to, word processing applications, spreadsheet applications, email client applications, image editing applications, and Portable Document Format (pdf) editing applications.

Restricted local applications 120 may be executed in response to user input selecting the executable files corresponding to the restricted local applications 120. As an example, a user may double click on a shortcut to a native email client application to open the native email client application. Once the native email client application is opened, the user may use a pointer, keyboard, or other input device to draft an email and transmit the email.

One or more embodiments include an operating system, script, or other application, with sufficient permissions, executing the restricted local applications 120. As an example, a WebSocket server 140, described below, may execute restricted local applications 120. Furthermore, some sandboxed applications may be prohibited from executing restricted local applications 120. As an example, web application 104, executed by web browser 106, may not have sufficient permissions to execute restricted local application 120. Permissions and mechanisms associated with executing restricted local applications 120 are further described below.

In an embodiment, a WebSocket server 140 may refer to an application that executes on machine 102. As an example, the WebSocket server 140 may correspond to a Transmission Control Protocol (TCP) application listening on a port of a server that follows a WebSocket protocol. Websocket server 140 includes functionality to receive and process requests from web browser 106. Websocket server 140 includes functionality to execute restricted local applications 120 and/or access data that is inaccessible to web application 104.

A WebSocket server is referred to herein as a specific example and should not be construed as limiting the scope of any of the embodiments. Operations described herein with relation to WebSocket server may instead or in addition be performed by any other server which (a) executes locally with respect to a particular web browser and (b) uses a protocol which allows for full-duplex communication with the particular web browser. The full-duplex communication between the particular web browser and the locally executing server (both executing on the same machine and/or in the same LAN) may be used to complete one or more requests from a web application executed by the particular web browser. The requests may be generated based on user input submitted via the web application.

In an embodiment, web browser 106 (commonly referred to as a "browser") is a software application generally used for retrieving, presenting, and traversing information resources on the World Wide Web. An information resource is identified by a Uniform Resource Identifier (URI/URL) and may be a web page, image, video or other piece of content. Hyperlinks present in resources enable users easily to navigate their browsers to related resources.

In an embodiment, web browser 106 executes a web application 104. Web application 104 is a client-server software application in which the client (or user interface) runs in a web browser (e.g., web browser 106). As an example, a web application may refer to a Customer Relationship Management (CRM) application. As additional examples, web applications are used for online retail sales, online auctions, wikis, instant messaging services.

In an embodiment, web browser 106 sandboxes web application 104. Sandboxing web application 104 may include, for example, restricting the web application 104 from executing certain applications (e.g., restricted local application 120) or accessing certain data sets. Web browser 106 is a capability system that gives web application 104 the ability to do specific things, such as HTML rendering. However, web browser 106 isolates web application 104 in the sandbox and restricts web application 104 from invoking restricted local applications 102 and retrieving certain data sets.

Web application 104 may display a user interface. User input submitted by a user, via the user interface, may include requests which require executing one or more restricted local applications 120 that the web application 104 is restricted from accessing. Examples of user requests include, but are not limited to: modifying a document using a local word processing application, composing an email using a local email client application, and retrieving a user profile from machine 102 (or another machine within a same LAN as machine 102).

In an embodiment, the web browser 106 may transmit user requests, received via the user interface displayed by web application 104, to WebSocket server 140 as detailed below. Communication by web browser 106 may be addressed to an identifier (e.g., an Internet Protocol (IP) address) corresponding to the WebSocket server 140. Communication between web browser 106 and WebSocket server 140 does not necessarily traverse any Internet routers. Communication between web browser 106 and WebSocket server 140 may be transmitted via components within machine 102 without being transmitted from machine 102 to any other device. Alternatively, communication between web browser 106 and WebSocket 140 may be transmitted via devices within a Local Area Network (LAN) which includes machine 102.

3. Using a Websocket Server to Serve Requests, from a Web Application, Received Through a Web Browser Executing on a Same Machine as the Websocket Server In an embodiment, a WebSocket server serves requests, received from a web application, through a web browser executing on the same machine as the WebSocket server. The WebSocket server may also requests received through web browsers executing on a machine with a same LAN as the machine executing the WebSocket server.

As an example, web application 104, executed by web browser 106, is a Customer Relationship Management (CRM) application. The web application 104 manages a document stored on a cloud server. A user submits a request, via the web application, to open the document in order to modify the document. Opening the document requires the use of a local word processing application. The web application 104 is sandboxed by web browser 106, and accordingly, unable to directly execute the local word processing application to modify the document.

The web application 104 may initiate a connection with a Websocket server 140 which is not restricted from executing the local word processing application. Establishing the connection with the WebSocket server 140 may involve the web application 104 transmitting a request, via the web browser 106, addressed to a particular port of the WebSocket server 140. The WebSocket server 140 and web application 104 execute a handshake and/or authentication process. Examples of authentication processes are described in Appendix A, Section 4.2 "Authentication" and Appendix A, Section 5.4 "Authentication". The web application 104, executed by the web browser 106, establishes the connection with the WebSocket server 140.

Based on user input, the web application 104 may transmit one or more requests to the WebSocket server 140 over the established connection. The web application 104 (a) downloads the document from the cloud server, and (b) transmits the document to WebSocket server 140. The WebSocket server 140 saves the document into a temporary folder on machine 102. Furthermore, the web application 104 transmits a request, to the WebSocket server, to open the document using a local word processing application.

The WebSocket server 140 may execute commands to open the local word processing application. Once the document is opened, the user may modify the document. Once the user completes the modification, the user closes the local word processing application. The WebSocket server 140 transmits the modified document to the web application 104. The web application 104 uploads the modified document to the cloud server.

As other examples, the WebSocket server 140 may perform operations including but not limited to:
 a. Use a restricted local application to open a file, modify the file, save the modified file, close the file, and upload the modified file.
 b. Use a restricted local application to compose and send an email.
 c. Use a restricted local application to perform an operation which uses one or more local resources.
 d. Use a restricted local application to forward communication to a computer system in a set of computer systems.
 e. Use a restricted local application to access information related to a local network, and perform an operation based on the information.

In an embodiment, the WebSocket server 140 is an on-demand server that may be executed or terminated depending on a current set of users logged into a system associated with the WebSocket server 140. Execution of the WebSocket server 140 commences when at least one user successfully logs-into a system, via a web browser 106, that is associated with the WebSocket server 140. The system may refer to any data management system and/or data processing system. In an example, the system refers to an online Customer Relationship Management (CRM) system accessible via a web browser.

As an example, when the web application 104 detects a successful login by a user, the web application 104 initiates the execution of the WebSocket server 140. The web application 104 may initiate the execution of the WebSocket server 140 using a Uniform Resource Identifier (URI) scheme. A particular address, for example, "websocket-server:example" may be binded to the execution of the WebSocket server 140. When the web application 104 detects a successful login by a user, the web application 104 invokes the particular URI. The particular URI directs the Operating System (OS) to initiate execution of the WebSocket server 140. The web application 104 may then establish a connection with the WebSocket server 140.

In an embodiment, the WebSocket server 140 is associated with a plurality of systems (and/or different instances of the same system) that may be accessed by a user via a web browser. As long as at least one user operating a machine, local to the WebSocket server, remains logged into a system associated with the WebSocket server, the WebSocket server continues to execute. When the machine 102 (or other machine in the same LAN) detects that no users are logged into a system associated with the WebSocket server, the WebSocket server is terminated. As an example, an application or OS terminating on machine 102 may cause termination of the WebSocket server.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:

executing a WebSocket server on a machine executing a web browser, the WebSocket server using a protocol allowing for full-duplex communication between the WebSocket server and the web browser;

establishing a connection between the WebSocket server and the web browser;

receiving, via the connection by the WebSocket server from a web application executed by the web browser, a request requiring execution of a local application on the machine, the local application being inaccessible by the web application, wherein the web browser sandboxes the web application;

responsive to the request: executing, by the WebSocket server, the local application to serve the request, wherein the WebSocket server, the web browser and the local application are executed on the machine.

2. The non-transitory computer readable medium of claim 1, wherein the connection between the Web Socket server and the web browser is established in response to a user successfully logging into a system, associated with the Web Socket server, via the web browser.

3. The non-transitory computer readable medium of claim 1, wherein the request is received by the Web Socket server responsive to:

displaying, via the web application, a user interface; and
receiving, via the user interface, a request from a user to execute the local application.

4. The non-transitory computer readable medium of claim 1, wherein the operations further comprise, prior to receiving the request by the Web Socket server, executing authentication between the Web Socket server and the web application.

5. The non-transitory computer readable medium of claim 1, wherein the request comprises one or more of: modifying a document, composing and sending an email, or forwarding communication to a computer system in a set of computer systems comprising the machine.

6. The non-transitory computer readable medium of claim 1, wherein:

the connection between the Web Socket server and the web browser is established in response to a user successfully logging into a system, associated with the Web Socket server, via the web browser;
the web browser sandboxes the web application;
the request is received by the Web Socket server responsive to:
  displaying, via the web application, a user interface; and
  receiving, via the user interface, a request from a user to execute the local application;
the request comprises one or more of: modifying a document, composing and sending an email, or forwarding communication to a computer system in a set of computer systems comprising the machine; and
the operations further comprise, prior to receiving the request by the Web Socket server, executing authentication between the Web Socket server and the web application.

7. A non-transitory computer readable medium comprising instructions which, when executed by one or more hardware processors, cause performance of operations comprising:

detecting at least one user successfully logging into a system via a web application executed by a web browser;

responsive to detecting the at least one user successfully logging into the system: initiating execution of a WebSocket server, associated with the system, on a particular machine that is executing the web browser;

receiving, by the WebSocket server from the web application via the web browser, a request requiring execution of a local application on the particular machine, the local application being inaccessible by the web application, wherein the web browser sandboxes the web application;

responsive to the request: executing, by the WebSocket server, the local application to serve the request, wherein the WebSocket server, the web browser and the local application are executed on the particular machine.

8. The non-transitory computer readable medium of claim 7, wherein the request is received by the Web Socket server responsive to:

displaying, via the web application, a user interface; and
receiving, via the user interface, a request from a user to execute the local application.

9. The non-transitory computer readable medium of claim 7, wherein the operations further comprise, prior to receiving the request by the Web Socket server, executing authentication between the Web Socket server and the web application.

10. The non-transitory computer readable medium of claim 7, wherein the request comprises one or more of: modifying a document, composing and sending an email, or forwarding communication to a computer system in a set of computer systems comprising the particular machine.

11. A non-transitory computer readable medium comprising instructions which, when executed by one or more hardware processors, cause performance of operations comprising:

executing a WebSocket server on a machine executing a web browser;

establishing a connection between the WebSocket server and the web browser;

receiving, by the Web Socket server from the web browser, a request requiring execution of a local application on the machine, the local application being inaccessible by a web application executed by the web browser, wherein the web browser sandboxes the web application;

responsive to the request: executing, by the WebSocket server, the local application to serve the request, wherein the WebSocket server, the web browser and the local application are executed on the machine.

12. The non-transitory computer readable medium of claim 11, wherein receiving the request from the web browser comprises receiving the request from the web application executed by the web browser.

13. The non-transitory computer readable medium of claim 12, wherein the web application is restricted from executing the local application.

14. The non-transitory computer readable medium of claim 12, wherein the request is received by the Web Socket server responsive to:

displaying, via the web application, a user interface; and
receiving, via the user interface, a request from a user to execute the local application.

15. The non-transitory computer readable medium of claim 12, wherein the operations further comprise, prior to receiving the request by the Web Socket server, executing authentication between the Web Socket server and the web application.

16. The non-transitory computer readable medium of claim 11, wherein the connection between the Web Socket server and the web browser is established in response to a user successfully logging into a system, associated with the Web Socket server, via the web browser.

17. The non-transitory computer readable medium of claim 11, wherein the request comprises one or more of: modifying a document, composing and sending an email, or forwarding communication to a computer system in a set of computer systems comprising the machine.

* * * * *

UNITED STATES PATENT AND TRADEMARK OFFICE
CERTIFICATE OF CORRECTION

PATENT NO. : 10,152,590 B2
APPLICATION NO. : 15/159572
DATED : December 11, 2018
INVENTOR(S) : Liu et al.

Page 1 of 1

It is certified that error appears in the above-identified patent and that said Letters Patent is hereby corrected as shown below:

In the Specification

In Column 1, Line 5, delete "CLAIM," and insert -- CLAIM; --, therefor.

In Column 2, Line 31, delete "MISCELLANEOUS," and insert -- MISCELLANEOUS; --, therefor.

Signed and Sealed this
Twenty-sixth Day of November, 2019

Andrei Iancu
*Director of the United States Patent and Trademark Office*